May 12, 1925.
W. E. McDONALD
OIL WELL RIG
Filed May 24, 1924
1,537,844
2 Sheets-Sheet 1
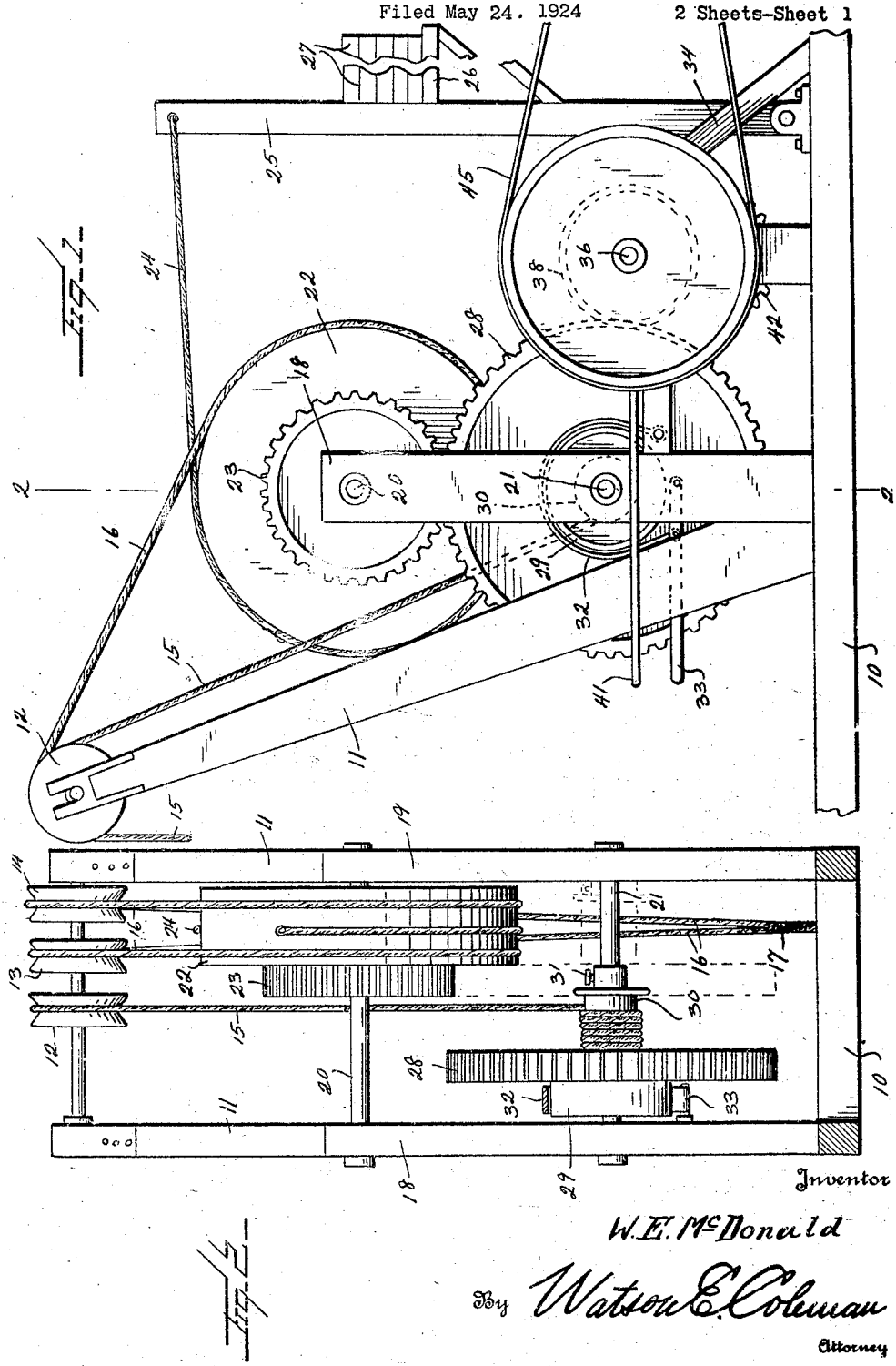
Inventor
W. E. McDonald
By Watson E. Coleman
Attorney

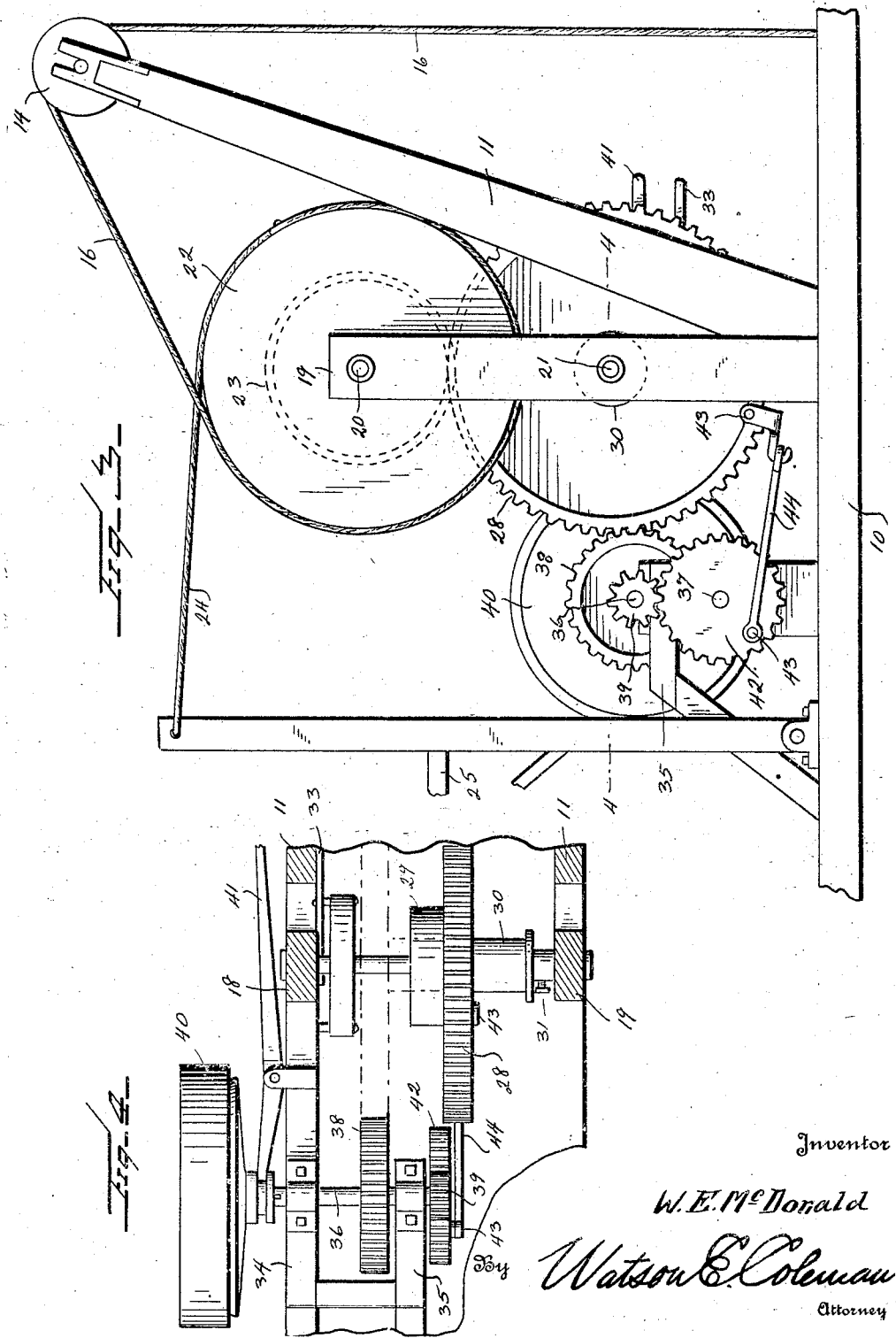

Patented May 12, 1925.

1,537,844

UNITED STATES PATENT OFFICE.

WILLIAM EDMON McDONALD, OF SPERRY, OKLAHOMA.

OIL-WELL RIG.

Application filed May 24, 1924. Serial No. 715,681.

*To all whom it may concern:*

Be it known that I, WILLIAM EDMON MC-DONALD, a citizen of the United States, residing at Sperry, in the county of Tulsa and State of Oklahoma, have invented certain new and useful Improvements in Oil-Well Rigs, of which the following is a specification, reference being had to the accompanying drawings.

This invention relates to oil well rigs and more particularly to a combined pumping and pulling rig.

An important object of the invention is to provide a device of this character which will be very simple in its construction and operation and which is readily convertible from a pumping to a pulling rig.

A further object of the invention is to provide a device of this character in which the minimum possible strain is placed upon the mechanism employed during pumping operations.

A still further object of the invention is to provide a device of this character which is readily and cheaply produced and installed and which, due to the simplicity of the mechanism employed, will be inexpensive to maintain and repair.

These and other objects I attain by the construction shown in the accompanying drawings, wherein for the purpose of illustration is shown a preferred embodiment of my invention and wherein:—

Figure 1 is a side elevation through a combined pumping and pulling apparatus constructed in accordance with my invention;

Figure 2 is a section on the line 2—2 of Figure 1;

Figure 3 is a side elevation taken from the opposite side of the device from that shown in Figure 1;

Figure 4 is a fragmentary plan view of the device showing the parts in position for pumping in solid lines and in dotted lines in the position for pulling, parts of the device being broken away.

Referring now more particularly to the drawings, the numeral 10 designates generally a suitable base from which projects upwardly a mast 11 preferably provided at its upper end with three sheaves 12, 13 and 14, the sheave 12 forming a sheave for a pulling line 15, and the sheaves 13 and 14 handling pumping lines 16 joined to one another and the pump rod as at 17. Two pump lines and sheaves therefor are disclosed but a single pump line and sheave may be employed if so desired.

Likewise extending upwardly from the base are spaced vertical supports 18 and 19 in which are mounted a pair of shafts 20 and 21. The shaft 20 has mounted thereon a line pulley 22 to one face of which is secured a gear wheel 23. To this line pulley adjacent opposite sides of the periphery thereof the pump lines 16 are secured, the lines preferably passing about three-fourths of the way about the line pulley. To the center of the line pulley, and likewise passing about three-fourths of the length about the pulley, a further line 24 is secured, this line leading to the upper end of a vertical support 25 pivoted at its lower end and having at the side thereof remote from the line pulley a platform 26 for the reception of counterweights 27.

Mounted upon the shaft 21 is a gear wheel 28 having at one side thereof a brake hub 29 and at the opposite side thereof a reel 30. Means are provided for securing this gear in adjusted positions upon the shaft, as at 31, and in one position thereof it engages with the gear 23 of the shaft 20 and in a second position thereof these gears are disengaged and the brake hub 29 enters a brake band 32 mounted upon one of the vertical members operated through a lever 33.

At that side of the supports 18 and 19 remote from the mast 11 horizontal supports 34 and 35 are provided upon which are mounted a pair of shafts 36 and 37. Upon one of these shafts is secured a gear 38 with which the gear 28 meshes when the brake hub 29 thereof is in a position to coact with the brake 32. One end of this shaft has secured thereto a pinion 39 and the opposite end thereof a clutch pulley 40, this clutch pulley having an operating lever 41 extending adjacent to the operating lever 33 of the brake so that the two may be readily accessible from one point. The pinion 39 of the shaft 36 meshes with a gear 42 carried by the shaft 37.

This gear 42 has its face coplanar with the corresponding face of the gear 28 when this gear is meshing with the gear 23 of the line pulley and these faces of these gears have secured thereto attaching elements 43 for a jerk line or link 44. The pulley 40 is driven by a belt 45 or the like from any suitable source of power.

In the operation of the device when it is desired to employ the device in pumping, the gear 28 is meshed with the gear 23 and the link 44 employed to connect the gears 28 and 42. The clutch of the pulley 40 is then engaged with the result that the rotation of the gear 42 is changed to an oscillation of the gear 28 and a corresponding oscillation of the gear 23 and line pulley 22, it being understood that the weight of the pump line and counterweights 27 will be sufficiently unbalanced to cause the pulley 22 to normally tend to move in one direction. This oscillation is, through the pump lines 16, transmitted to reciprocation of the pump line proper. When it is desired to pull or lower casing the pulley 28 is shifted upon the shaft 21 to the position where it engages with the pulley 38. The line 15 is then secured to the reel 30 and movement of the reel controlled through the brake 32 and clutch of the pulley 40. It will be obvious that this change in operation can be readily effected with a minimum loss of time and it will furthermore be obvious that the construction hereinbefore set forth is capable of a certain range of change and modification without materially departing from the spirit of my invention and I accordingly do not limit myself to such specific structure except as hereinafter claimed.

I claim:

1. In a combined pumping and pulling rig, a shaft, a line pulley mounted for rocking movement thereon, a pair of lines oppositely wound upon the line pulley, a connection between one of said lines and the pump line of the well, a connection between the other of said lines and a counterweight, means for rocking said line pulley including a drive shaft, means for rotating the drive shaft, a third shaft, a gear mounted upon the third shaft, a gear secured to the line pulley and with which the pulley of the third shaft is engageable, and a connection between the drive shaft and the gear of the third shaft for rocking the gear of the third shaft.

2. In a combined pumping and pulling rig, a shaft, a line pulley mounted for rocking movement thereon, a pair of lines oppositely wound upon the line pulley, a connection between one of said lines and the pump line of the well, a connection between the other of said lines and a counterweight, means for rocking said line pulley including a drive shaft, means for rotating the drive shaft, a third shaft, a gear mounted upon the third shaft, a gear secured to the line pulley and with which the pulley of the third shaft is engageable, a connection between the drive shaft and the gear of the third shaft for rocking the gear of the third shaft, said drive shaft having a pinion thereon, the gear of the second shaft being shiftable upon said second shaft for engagement with the pinion, and means for braking the third shaft operable when the gear thereof is in the last named position.

3. In a combined pumping and pulling rig, a shaft, a line pulley mounted for rocking movement thereon, a pair of lines oppositely wound upon the line pulley, a connection between one of said lines and the pump line of the well, a connection between the other of said lines and a counterweight, means for rocking said line pulley including a drive shaft, means for rotating the drive shaft, a third shaft, a gear mounted upon the third shaft, a gear secured to the line pulley and with which the pulley of the third shaft is engageable, a connection between the drive shaft and the gear of the third shaft for rocking the gear of the third shaft, said drive shaft having a pinion thereon, the gear of the third shaft being shiftable upon said third shaft for engagement with the pinion, and means for braking the third shaft operable when the gear thereof is in the last named position, the drive of the drive shaft including a clutch pulley.

4. In a combined pumping and pulling rig, a shaft, a line pulley mounted for rocking movement thereon, a pair of lines oppositely wound upon the line pulley, a connection between one of said lines and the pump line of the well, a connection between the other of said lines and a counterweight, means for rocking said line pulley including a drive shaft, means for rotating the drive shaft, a third shaft, a gear mounted upon the third shaft, a gear secured to the line pulley and with which the pulley of the third shaft is engageable, a connection between the drive shaft and the gear of the third shaft for rocking the gear of the third shaft, said drive shaft having a pinion thereon, the gear of the third shaft being shiftable upon said third shaft for engagement with the pinion, means for braking the third shaft operable when the gear thereof is in the last named position including supports for the third shaft, a brake band carried by the supports, and a brake hub carried by the gear of the third shaft and entering the brake band when the gear is in the last named position.

5. In a combined pumping and pulling rig, a shaft, a line pulley mounted for rocking movement thereon, a pair of lines oppositely wound upon the line pulley, a connection between one of said lines and the pump line of the well, a connection between the other of said lines and a counterweight, means for rocking said line pulley including a drive shaft, means for rotating the drive shaft, a third shaft, a gear mounted upon the third shaft, a gear secured to the line pulley and with which the pulley of the third shaft is engageable, a connection between the drive shaft and the gear of the third shaft for rocking the gear of the third shaft, said drive shaft having a pinion thereon, the gear of the third shaft being shiftable upon said third shaft for engagement with the pinion, and means for braking the third shaft operable when the gear thereof is in the last named position, said gear of the third shaft including a hub forming a winding drum.

In testimony whereof I hereunto affix my signature.

WILLIAM EDMON McDONALD.